United States Patent
Takahashi (10) Patent No.: US 8,754,613 B2
(45) Date of Patent: Jun. 17, 2014

(54) CHARGING DEVICE, ELECTRONIC EQUIPMENT INCLUDING SAME, AND CONTROL METHOD OF CHARGING DEVICE

(75) Inventor: Keisuke Takahashi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 611 days.

(21) Appl. No.: 12/839,685

(22) Filed: Jul. 20, 2010

(65) Prior Publication Data

US 2011/0018500 A1    Jan. 27, 2011

(30) Foreign Application Priority Data

Jul. 21, 2009    (JP) .................................. 2009-169750

(51) Int. Cl.
    *H02J 7/04*    (2006.01)
(52) U.S. Cl.
    USPC .......................................... 320/141; 320/164
(58) Field of Classification Search
    USPC ................. 320/112, 141, 145, 148, 160, 164; 324/430
    See application file for complete search history.

(56) References Cited

U.S. PATENT DOCUMENTS

| | | | | |
|---|---|---|---|---|
| 5,642,031 A | * | 6/1997 | Brotto | 320/156 |
| 5,710,506 A | * | 1/1998 | Broell et al. | 320/145 |

FOREIGN PATENT DOCUMENTS

| | | |
|---|---|---|
| JP | 7-298511 | 11/1995 |
| JP | 2009-247142 | 10/2009 |

* cited by examiner

*Primary Examiner* — Edward Tso
*Assistant Examiner* — Aaron Piggush
(74) *Attorney, Agent, or Firm* — Cooper & Dunham LLP (57) ABSTRACT

A charging device to charge a secondary battery that includes a DC/DC circuit to generate a charging current supplied to the secondary battery, an impedance measurement circuit to measure an impedance of the secondary battery, a first control circuit to output a duty-cycle decrease signal in accordance with the measured impedance, a charging-current monitor circuit to detect the charging current outputted from the DC/DC circuit when the duty cycle of the pulses generated by the DC/DC circuit is decreased by the duty-cycle decrease signal, and, a second control circuit to compare the charging current detected by the charging-current monitor circuit and a charging-current threshold and to output to the DC/DC circuit a frequency change signal that increases a switching operation frequency in the DC/DC circuit.

17 Claims, 10 Drawing Sheets

CHARGING DEVICE, ELECTRONIC EQUIPMENT INCLUDING SAME, AND CONTROL METHOD OF CHARGING DEVICE

BACKGROUND OF THE INVENTION

1. Field of the Invention

The present invention relates to a charging device for a secondary battery installable in electronic equipment such as mobile phones and portable computers.

2. Discussion of the Background

Charging devices that charge secondary batteries, such as on-board Li+/Li polymer batteries installable in electronic equipment such as mobile phones and portable computers, are often included in the electronic equipment itself.

When the charging the secondary batteries, it is necessary to charge rapidly while inhibiting heat generation in the electronic equipment.

For example, when a linear controlling type charging technique is used, although heat generation in the equipment can be prevented, the charging cannot not be executed in a short time.

By contrast, when step-down direct-current to direct-current (DC/DC) charges or pulse charging techniques are used, charging can be executed rapidly while inhibiting the electronic equipment from generating heat.

However, although charging by step-down DC/DC or pulse controlling is effective, such effects cannot be obtained when the secondary battery is in poor condition (depleted).

More specifically, because internal impedance of the battery is increased when the battery is depleted, in usual pulse wide modulation (PWM) control ripple voltage of the secondary battery becomes larger, the battery is depleted earlier, and power supply rejection ratio (PSRR) of the target to which electricity is supplied is not secured, which are problems.

Furthermore, if an attempt is made to solve these problems by just decreasing the duty cycle, the supplied power becomes insufficient, lengthening the time required for charging.

In order to solve the problem described above, Japanese Patent No. 3,420,325 proposes a charging device that performs duty-cycle decreasing and current adjustment in accordance with battery condition, and therefore the ripple voltage can be alleviated. Accordingly, depletion of the secondary battery can be prevented, and PSRR to the supplied object can be secured. However, the problem prolonged charging time when the battery is depleted remains unsolved.

Accordingly, there is a need for a technology to effectively charge the depleted battery in the charging device without prolongation of the charging time.

SUMMARY OF THE INVENTION

In view of the foregoing, one illustrative embodiment of the present invention provides a charging device to charge a secondary battery. The charging device includes a DC/DC circuit, an impedance measurement circuit, a first control circuit, a charging-current monitor circuit, and a second control circuit. The DC/DC circuit generates a charging current supplied to the secondary battery. The impedance measurement circuit measures an impedance of the secondary battery. The first control circuit outputs a duty-cycle decrease signal in accordance with the measured impedance. The charging-current monitor circuit detects the charging current outputted from the DC/DC circuit when the duty cycle of the pulses generated by the DC/DC circuit is decreased by the duty-cycle decrease signal. The second control circuit compares the charging current detected by the charging-current monitor circuit and a charging-current threshold and outputs to the DC/DC circuit a frequency change signal that increases a switching operation frequency in the DC/DC circuit.

Another illustrative embodiment of the present invention provides an electronic device that employs the charging device described above.

Another illustrative embodiment of the present invention provides a method for controlling a charging device to charge a secondary battery. The method includes generating a charging current supplied to the secondary battery with a DC/DC circuit, measuring impedance of the secondary battery, adjusting a duty cycle of pulses generated in the DC/DC circuit in accordance with the measured impedance, detecting a charging current supplied to the secondary battery; comparing the detected charging current and a first charging-current threshold when the duty cycle of the pulses generated in the DC/DC circuit is adjusted; and increasing a clock frequency to switch the DC/DC circuit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIG. 1, a charging device according to one embodiment of the present invention is described below.

Figure 1:
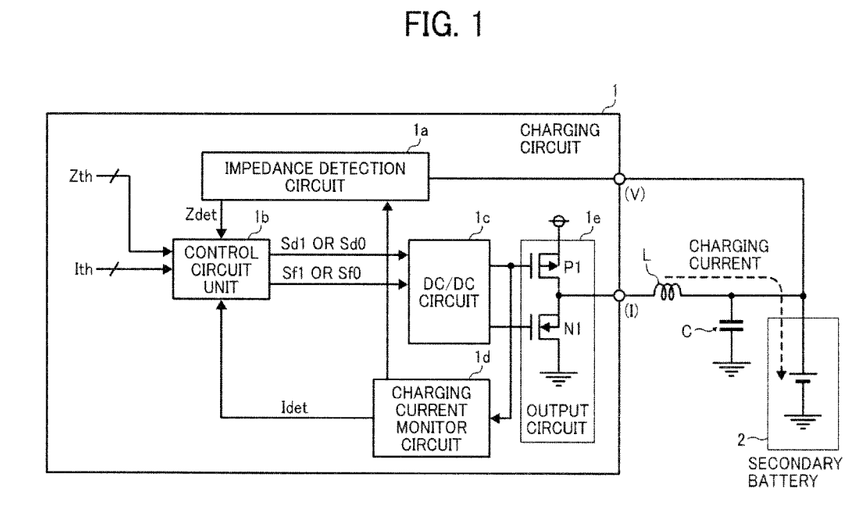
FIG. 1 is a diagram of circuitry of a charging device according to one illustrative embodiment of the present invention.

FIG. 1 shows a circuitry of a charging device 1 according to the present embodiment.

Referring to FIG. 1, the charging device 1 includes an impedance measurement circuit 1a, a control circuit 1b, a direct current to direct current (DC/DC) circuit 1c, a charging-current monitor circuit 1d, and an output circuit 1e. The output circuit 1e in the charging device 1 supplies a charging current I to a secondary battery 2 via an inductor L and a capacitor C. The output circuit 1e includes a positive channel metal oxide semiconductor (P-MOS) transistor P1 and a negative channel MOS (N-MOS) transistor N1. The secondary battery 2 is included in an electronic device such as a mobile phone or a portable computer.

The DC/DC circuit 1c usually switches in accordance with a duty-cycle control (decrease/keep) signal outputted from the control circuit 1b, generates the charging current I, and outputs the charging current I via the output circuit 1e. The charging current I thus outputted from the output circuit 1e is supplied to the secondary battery 2 via the inductor L and the capacitor C, which charges the secondary battery 2.

Herein, the DC/DC circuit generates the charging current I and generates clock pulses for switching operation (hereinafter called switching pulses SW). The charging-current monitor circuit 1d functions as a charging current detection circuit and continuously monitors the charging current I flowing through a charging route of the charging device 1 and outputs a charging current signal Idet.

A feature of this disclosure is that the impedance measurement circuit 1a measures impedance in the secondary battery 2 either at the start of charging or during charging.

Figure 2:
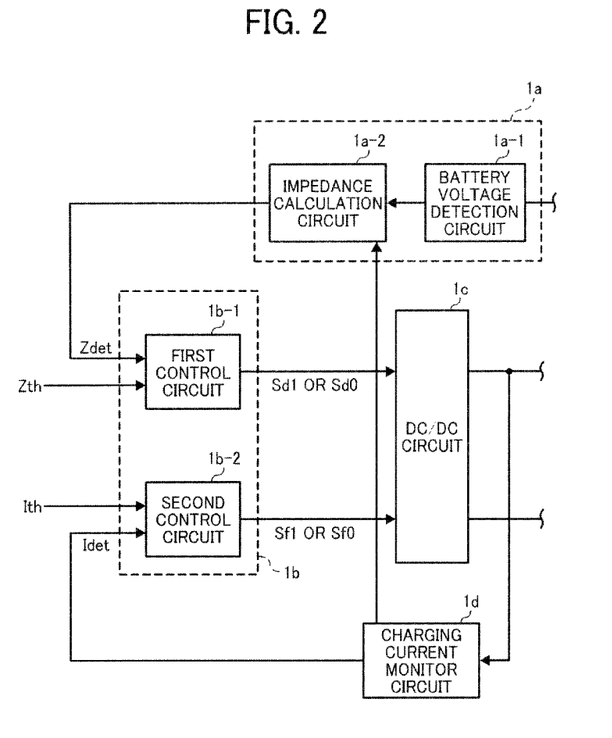
FIG. 2 is an enlarged diagram illustrating circuitry of the charging device shown in FIG. 1.

FIG. 2 shows an enlarged diagram illustrating circuitry of a portion of the charging device 1 shown in FIG. 1. As shown in FIG. 2, the impedance measurement circuit 1a includes a battery-voltage detection circuit 1a-1 and an impedance calculation circuit 1a-2. The battery-voltage detection circuit 1a-1 detects a voltage V of the secondary battery 2, and the detected voltage V is outputted to the impedance calculation circuit 1a-2. The impedance calculation circuit 1a-2 also receives the charging current signal Idet from the charging-current monitor circuit 1d and then calculates an impedance value Zdet based on the charging current signal Idet from the charging-current monitor circuit 1d and the voltage V of the secondary battery 2.

Subsequently, the impedance measurement circuit 1a outputs the measurement result (calculated impedance) Zdet to the control circuit 1b.

As shown in FIG. 2, the control circuit unit 1b includes a first control circuit 1b-1 and the second control circuit 1b-2. The first control circuit 1b-1 generates a duty-cycle decrease signal Sd1 that decreases the duty cycle (ratio of pulse duration to cycle duration) of the switching pulses SW generated in the DC/DC circuit 1c in accordance with the measurement result (calculated impedance Zdet) from the impedance measurement circuit 1a, and outputs the duty-cycle decrease signal Sd1 to the DC/DC circuit 1c.

More specifically, in the present embodiment, the first control circuit 1b-1 compares the measurement result (calculated impedance Zdet) from the impedance measurement circuit 1a and an impedance threshold value Zth that is set in advance, generates the duty-cycle decrease signal Sd1 in accordance with the comparison result, and outputs the duty-cycle decrease signal Sd1 to the DC/DC circuit 1c.

At this time, when the calculated impedance Zdet from the impedance measurement circuit 1a is greater than the threshold value Zth set in advance (Zdet>Zth), the second control circuit 1b-2 determines that the secondary battery 2 is depleted and generates the duty-cycle decrease signal Sd1 in accordance with the calculated impedance Zdet to decrease the duty cycle of the pulses SW generated in the DC/DC circuit 1c.

The DC/DC circuit 1c decreases the duty cycle of the switching pulses SW in accordance with the duty-cycle decrease signal Sd1 from the first control circuit 1b-1, which is a state hereinafter called "duty-cycle decreased state", and therefore a ripple voltage in the secondary battery 2 can be inhibited. On the other hand, when the calculated impedance Zdet is lower than the threshold value Zth, the first control circuit 1b-1 outputs a signal Sd0 to maintain the current duty cycle of the switching pulses SW unchanged.

When the duty cycle of the switching pulses SW is reduced, the supply voltage required for charging may become insufficient. In order to solve this problem, in the present embodiment the charging device 1 further includes the charging-current monitor circuit 1d that monitors the charging current at an output terminal of the DC/DC circuit 1c and outputs the monitoring result as the charging current signal Idet to the second control circuit 1b-2.

When the charging current signal Idet detected by the charging-current monitor circuit 1d is lower than a threshold value Ith (Idet<Ith), the second control circuit 1b-2 in the control circuit unit 1b generates a frequency change signal Sf1 to increase a clock frequency to switch the DC-DC circuit 1c (hereinafter "switching frequency"). Thus, by increasing the switching frequency in the duty-cycle decreased state in the DC/DC circuit 1c, lengthening of charging time can be avoided.

As described above, in the charging device 1 shown in FIG. 1, the impedance measurement circuit 1a measures the impedance of the secondary battery 2 when the secondary battery 2 starts to be charged or during charging, and the first control circuit 1b-1 in the control circuit 1b varies the duty cycle of the switching pulses SW generated in the DC/DC circuit 1c in accordance with the measurement result (calculated impedance Zdet).

More specifically, when the calculated impedance Zdet is relatively high, the charging device 1 determines that the secondary battery 2 is depleted and decreases the duty cycle of the switching pulses SW. Accordingly, the ripple voltage generated in the secondary battery 2 can be alleviated.

In addition, the charging-current monitor circuit 1d detects change in the charging current supplied to the secondary battery 2, and the detection result Idet is inputted to the second control circuit 1b-2 in the control circuit 1b. When the second control circuit 1b-2 detects that the charging current supplied to the secondary battery 2 is decreased by varying (decreasing) the duty cycle of the switching pulses SW, the second control circuit 1b-2 outputs a frequency change signal Sf1 that increases the switching frequency in the DC/DC circuit 1c, which prevents the charging current from decreasing and therefore also prevents prolongation of the charging time.

In a known charging method for a lithium ion secondary battery, when the secondary battery is in an over-discharged state, initially, a charging device charges the secondary battery with relatively small current, that is, performs "precharging". Then, after the charging voltage reaches a first predetermined voltage, the charging device charges the secondary battery with a relatively large constant charging current, that is, performs "constant-current charging" (hereinafter also "rapid charging"). Then, after the charging voltage reaches a predetermined second voltage greater than the first predetermined voltage, the charging device charges the secondary battery with constant voltage, that is, performs "constant-voltage charging".

In order to use this charging method, in the charging device 1, the charging current I or a voltage applied to the secondary battery 2 is controlled by controlling a gate voltage of the P-MOS transistor P1 in the output circuit 1e. More specifically, when the charging operation starts, the battery-voltage detection circuit 1a-1 detects the battery voltage V of the secondary battery 2.

In the over-discharged state in which the charging power of the secondary battery is fully consumed and battery voltages V at both ends of the secondary battery are lower than the first predetermined voltage V1 (V<V1), charging the secondary battery by supplying a high current thereto may degrade the charging cycle of the secondary battery depleted, and the secondary battery may leak or burst.

In order to avoid this problem, when the secondary battery is in the over-discharged state (is heavily discharged), the secondary battery should be charged with relatively small pre-charging current ranging from several mA (for example, 10 mA) to several ten mA until the battery voltage V exceeds the first predetermined voltage V1.

At this time, in the charging device 1, the charging-current monitor circuit 1d monitors the charging current Idet and controls the gate voltage of the P-MOS transistor P1 in the output circuit 1e so that the charging current I is kept at a first required current I1 when the secondary battery 2 is in the over-discharged state (pre-charging state).

Then, as the pre-charging proceeds, the battery voltage V increases. When the battery voltage V becomes higher than the first predetermined voltage V1 (V>V1), the secondary batter 2 is charged with a higher current ranging from 300 mA to 700 mA (for example, 600 mA), that is, rapid charging is performed. Namely, when the battery voltage V becomes higher than the first predetermined voltage V1, the charging device 1 performs the constant-current charging as the rapid charging.

At this time, the charging device 1 controls the gate voltage so that the monitored charging current I is kept at an amount of the current to be supplied set in advance. Thus, rapid charging starts.

As described above, the charging device 1 controls the gate voltage of the P-MOS transistor P1 in the output circuit 1e so that the amount of the charging current I flowing through the charging route in the charging device 1 can be kept constant during the pre-charging and during rapid charging, that is, the pre-charging and the rapid charging are performed at constant current.

It is to be noted that, in the charging device 1, when the secondary battery 2 is over-discharged, the charging device 1 outputs the amount of current during pre-charging, and when the secondary 2 is not in over discharge state, the charging device 1 outputs the amount of current during the constant-current. It is to be noted that because the pre-charging is operated preliminary to rapid charging of the secondary battery 2 quickly, the pre-charging is not always required.

As the rapid charging proceeds further and the battery voltage V increases and becomes higher than a second predetermined voltage V2 (V>V2>V1), continuing the constant current charging in this state is not desirable. For example, when the secondary battery is a lithium ion battery, metal lithium melts, which is dangerous.

In view of the foregoing, generally, after a certain degree of the charging proceeds and the battery voltage reaches the second predetermined voltage V2, the charging is performed not with constant current but with constant voltage. That is, the charging is executed so that the voltage applied to the secondary battery is kept at a predetermined constant voltage (hereinafter referred as constant-voltage charging).

More specifically, when the battery voltage V of the secondary battery 2 detected by the battery-voltage detection circuit 1a-1 reaches the secondary predetermined voltage V2, the gate voltage of the P-MOS transistor P1 in the output circuit 1e is controlled so that the battery voltage V is kept at the second predetermined voltage V2.

Further, in the charging device 1, the charging-current monitor circuit 1d monitors the mount of the current flowing I through the charging route, and when the charging current I becomes lower than a predetermined charging completion current value I3 (I≤I3), the charging device 1 determines that the charging is completed, and then charging operation is finished.

Herein, the operation of the charging device 1 is described below with reference to FIGS. 3 and 4A.

Figure 3:
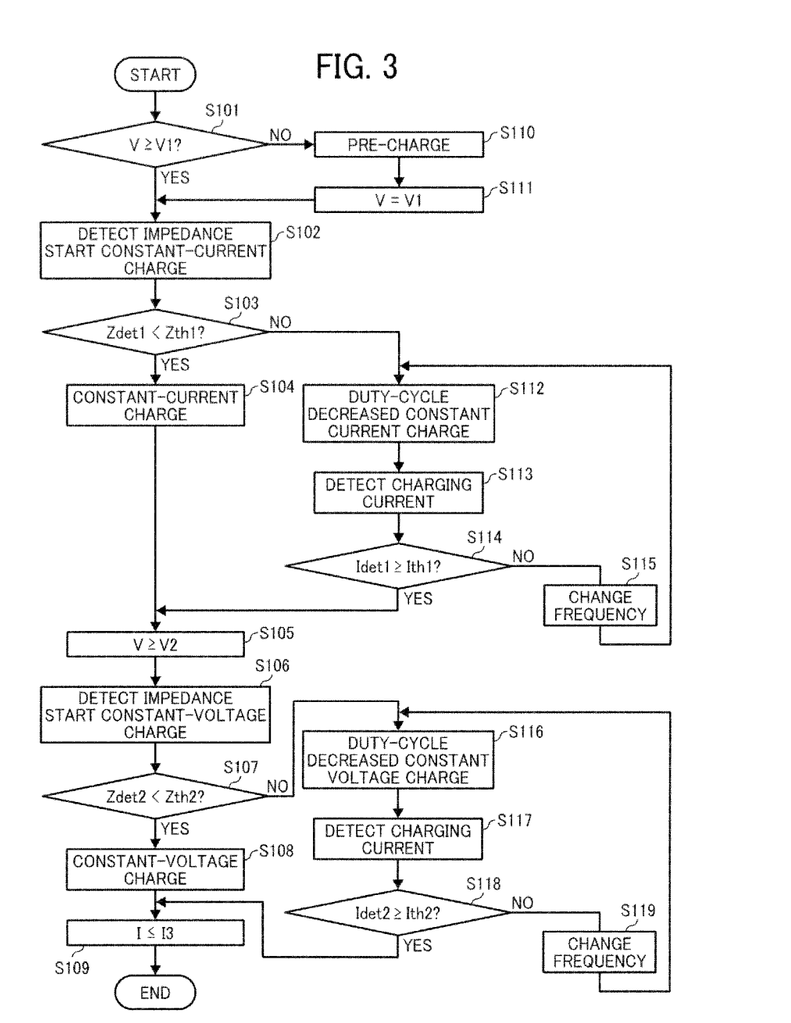
FIG. 3 is a flowchart of operations performed by the charging device shown in FIG. 1.
Figure 4A:
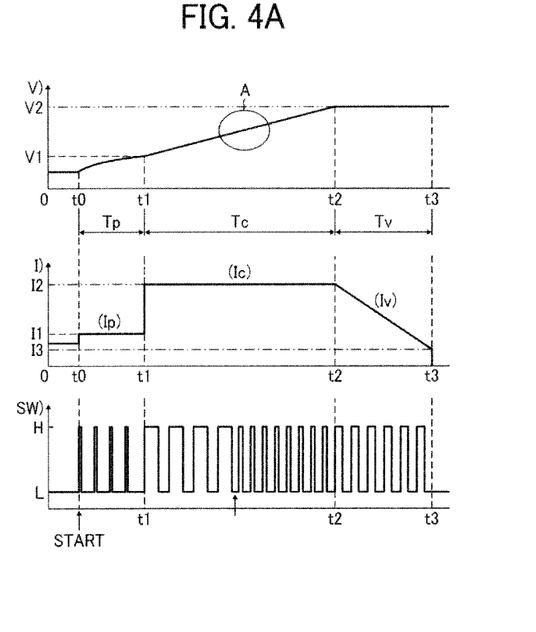
FIG. 4A is a timing chart illustrating operation of the charging device 1 shown in FIG. 1.

FIGS. 3 and 4A are respectively a flowchart and a timing chart illustrating the operation of the charging device 1.

In the description below, reference character Zdet1 designates a measured impedance during constant-current charging, reference character Zdet2 designates a measured impedance during constant-voltage charging, a reference character Idet1 designates a detected current signal during constant-current charging, and a reference character Idet2 designates a detected current signal during constant-voltage current charging. In addition, a reference character Zth1 designates a predetermined threshold impedance value during constant-current charging, a reference character Zth1 designates a predetermined threshold impedance value during constant-current charging, a reference character Zth2 designates a predetermined threshold impedance value during constant-voltage charging, a reference character Ith1 designates a predetermined threshold current value during constant-current charging, a reference character Ith2 designates a predetermined threshold current value during constant-voltage charging. Herein, the predetermined threshold impedance values Zth1 and Zth2 serve as impedance threshold values, and the predetermined threshold current values Ith1 and Ith2 serve as current threshold values.

Referring to FIG. 3, at step S101, when the battery voltage V that is detected by the battery-voltage detection circuit 1a-1 is higher than the first predetermined voltage (V≥V1) at the start of charging in the charging device 1, the process proceed to S102 to charge the secondary battery 2 at the constant current (rapid charge) without pre-charging. By contrast, when the charging voltage V is lower than the predetermined voltage V1 (V<V1, NO at step S101), the charging device 1 performs pre-charging at step S110.

Then, when the charging voltage V reaches the first predetermined voltage V1 by pre-charging at S111, the charging device 1 stops pre-charging and the process proceeds to the constant-current charging (rapid charging) at step S102.

When the charging device 1 begins rapid charging with the constant current, initially, at step S102, the impedance measurement circuit 1a measures the impedance Zdet1 in the secondary battery 2. Then, at step S103, the first control circuit 1b-1 compares the calculated impedance Zdet1 and the predetermined threshold value Zth1 and determines whether or not the secondary battery 2 is in a depleted condition and restriction of the duty cycle is required.

When the calculated impedance Zdet1 is equal to or smaller than the predetermined threshold value Zth1 (Zdet1≤Zth1), (Yes at step S103), the first control circuit 1b-1 determines that the secondary battery 2 is not depleted, that is, the restriction of duty cycle is not required, and thus the charging device 1 performs the constant current charging at step S104. At this time, the first control circuit 1b-1 outputs a signal Sd0 to maintain the current duty cycle of the switching pulses SW in the DC/DC circuit 1c unchanged, and therefore the constant current charging is continued.

By contrast, when the calculated impedance Zdet1 is greater than the predetermined threshold value Zth1 (Zdet1>Zth1), (No at step S103), the first control circuit 1b-1 determines that the secondary battery 2 is depleted, that is, restriction of the duty cycle is required, and thus the charging device 1 performs a duty-cycle decreased constant-current charging at step S112. More specifically, the first control circuit 1b-1 outputs to the DC/DC circuit 1c a signal Sd1 to decrease the duty cycle of the switching pulses SW in the DC/DC circuit 1c, and the constant current charging is performed with the duty cycle of the switching pulses SW reduced.

Then, at step S113, the charging-current monitor circuit 1d monitors decreases in the power supply in the duty-cycle decreased constant-current charging and detects the charging current signal Idet1.

Then, the detected charging current signal Idet1 is outputted to the second control circuit 1b-2, and the second control circuit 1b-2 compares the detected charging current signal Idet1 with the predetermined threshold signal value Ith1 (S114).

When the detected charging current signal Idet1 is equal to or greater than the predetermined threshold signal value Ith1 (Idet1≥Ith1) (Yes at step S114), the duty-cycle decreased constant-current charging is continued. More specifically, the second control circuit 1b-2 outputs to the DC/DC circuit 1c a signal Sf0 to maintain the current switching frequency of the DC/DC circuit 1c, and therefore the duty-cycle decreased constant-current charging is continued. Then, the process proceeds to S105.

By contrast, when the detected charging current signal Idet1 is smaller than the predetermined threshold signal value Ith1 (Idet1<Ith1) (No at step S114), the second control circuit 1b-2 determines that the power supply for the secondly battery 2 is decreased. At this time, the second control circuit 1b-2 outputs a frequency change signal Sf1 to increase the switching frequency of the DC/DC circuit 1c, and then normal amount of the power supply is secured (S115).

Then, at step S105, when the charging voltage V reaches the second predetermined voltage V2 by constant-current charging or duty-cycle decreased (and switching frequency increased) constant-current charging, the charging process proceeds to constant voltage charging in the charging device 1.

When the charging device 1 begins the constant-voltage charging, initially, at step S106, the impedance measurement circuit 1a measures the impedance Zdet2 in the secondary battery 2. Then, at step S107, the first control circuit 1b-1 compares the calculated impedance Zdet2 and the predetermined threshold value Zth2 and determines whether or not the secondary battery 2 is depleted and the restriction of the duty cycle is required.

When the calculated impedance Zdet2 is equal to or smaller than the predetermined threshold value Zth2 (Zdet2≤Zth2), (Yes at step S107), the first control circuit 1b-1 determines that the secondary battery 2 is not depleted, that is, the restriction of the duty cycle is not required, and thus the charging device 1 performs the constant-voltage charging at step S108. At this time, the first control circuit 1b-1 outputs to the DC/DC circuit 1c a signal Sd0 to maintain the duty cycle of the switching pulses SW in the DC/DC circuit 1c unchanged, and therefore the constant current charging is continued.

By contrast, when the calculated impedance Zdet2 is greater than the predetermined threshold value Zth2 (Zdet2>Zth2), (No at step S107), the first control circuit 1b-1 determines that the secondary battery 2 is depleted, that is, the restriction of the duty cycle is required, and thus the charging device 1 performs a duty-cycle decreased constant-voltage charging at step S116. More specifically, the first control circuit 1b-1 outputs to the DC/DC circuit 1c a duty-cycle decrease signal Sd1 to decrease the duty cycle of the switching pulse SW to the DC/DC circuit 1c, and the constant-voltage charging is performed while reducing the duty cycle of the switching pulses SW.

Then, at step S117, the charging-current monitor circuit 1d monitors the decrease in the power supply in the duty-cycle decreased constant-voltage charging at step S116 and detects the charging current signal Idet2.

Then, the detected charging current signal Idet2 is outputted to the second control circuit 1b-2, and the second control circuit 1b-2 compares the detected charging current signal Idet2 and the predetermined threshold signal value Ith2 (S118).

When the detected charging current signal Idet2 is equal to or greater than the predetermined threshold signal value Ith2 (Idet2≥Ith2) (Yes at step S118), the duty-cycle decreased constant-voltage charging is kept. More specifically, the second control circuit 1b-2 outputs to the DC/DC circuit 1c a signal Sf0 to maintain the switching frequency of the DC/DC circuit 1c unchanged, and therefore, the duty-cycle decreased constant-current charging is continued. Then, the process proceeds to S109

By contrast, when the detected charging current signal Idet2 is smaller than the predetermined threshold signal value Ith2 (Idet2<Ith2) (No at step S118), the second control circuit 1b-2 determines that the power supply for the secondly battery 2 is decreased. At this time, the second control circuit 1b-2 outputs to the DC/DC circuit 1c a frequency change signal Sf1 to increases the switching frequency of the DC/DC circuit 1c, and then normal amount of the power supply is secured. (S119)

Then, when the charging current I detected by the battery-voltage detection circuit 1a-1 becomes lower than the predetermined current I3 (I≤I3), at step S109, the charging device 1 determines that the charging is completed, and the charging operation is finished.

It is to be noted that although in the flowchart shown in FIG. 3 the impedance measurement circuit 1a measures the impedance when the constant-current charging begins and when the constant-voltage charging begins, the timing to detect impedance is not limited thereto. For example, the charging device according to the present embodiment can detect the impedance during the constant-current charging, during the constant-voltage charging, during pre-charging, or when the pre-charging begins.

Figure 4B:
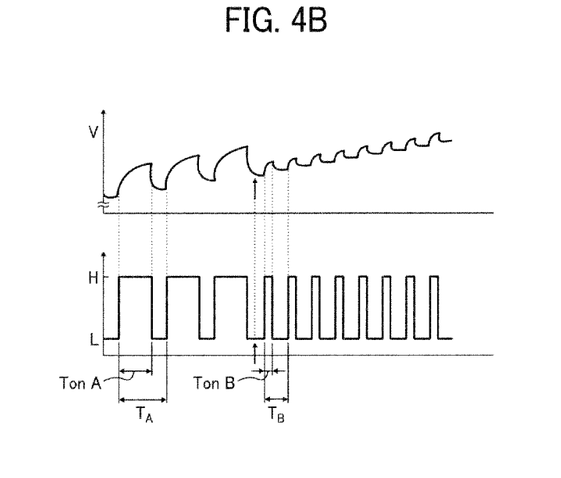
FIG. 4B is a enlarged graph illustrating a relation between charging voltage and pulses, shown in FIG. 4A, generated in a DC/DC circuit included in the charging device.

FIG. 4A is a timing chart illustrating operation of the charging device 1 shown in FIG. 1 and FIG. 4B is an enlarged graph illustrating a relation between a charging voltage V and the switching pulses SW shown in FIG. 4A. It is to be noted that, in FIG. 4A reference characters Tp, Tc, and Tv respectively represents time periods of pre-charging, constant-current charging, and constant-voltage charging.

More specifically, FIG. 4B shows changes in the ripple voltage of the charging voltage V based on the switching pulses SW in the DC/DC circuit 1c when depletion of the secondary battery 2 is detected during the constant-current charging, indicated by circle A shown in FIG. 4A. When depletion of the secondary battery 2 is detected, as shown in FIG. 4B, the ripple voltage generated in the charging voltage can be alleviated because the switching pulses SW are adjusted so that the duty cycle is reduced and the switching frequency decreased.

As described above, in the charging device 1 according to the present embodiment, the first control circuit 1b-1 changes the duty cycle of the switching pulses SW generated in the DC/DC circuit 1c in accordance with the calculated impedance. More specifically, when the calculated impedance Zdet is higher than the threshold value Zth (Zdet>Zth), the duty cycle of the switching pulses SW in the DC/DC circuit 1c is decreased. For example, as shown in FIG. 4B, a duty cycle (the ratio of pulse duration to cycle duration) (Ton$_A$/T$_A$) in the switching pulses SW is varied to a duty cycle (Ton$_B$/T$_B$) when depletion of the secondary battery 2 is detected. Accordingly, the ripple voltage in the secondary battery 2 can be alleviated.

In addition, in the present embodiment, because the charging-current monitor circuit 1d monitors the change of the charging current supplied to the secondary battery 2, when the decrease in the charging current I supplied to the secondary battery 2 is detected because the duty cycle of the switching pulses SW is decreased, the switching frequency is increased. As the frequency is increased, cycle length becomes shorter. For example, as shown in FIG. 4B, a period T$_A$ is shortened to a period T$_B$ when depletion of the secondary battery 2 is detected. Therefore, the decrease in the charging current of the secondary battery 2 can be prevented, as can prolongation of the charging time.

As described above, even when the secondary battery 2 is depleted, ripple voltage can be inhibited. In addition, because the charging voltage V can be maintained in spite of the decrease in duty cycle of the switching pulses SW and the ripple voltage can be inhibited, the power supply rejection ratio (PSRR) can be maintained.

It is to be noted that although the impedance threshold values Zth1 and Zth2 are set in advance, the user can directly input and set the threshold values in accordance with characteristic of the charged secondary battery 2.

(Second Embodiment)

Next, a second embodiment is described below with reference to FIG. 5.

Figure 5:
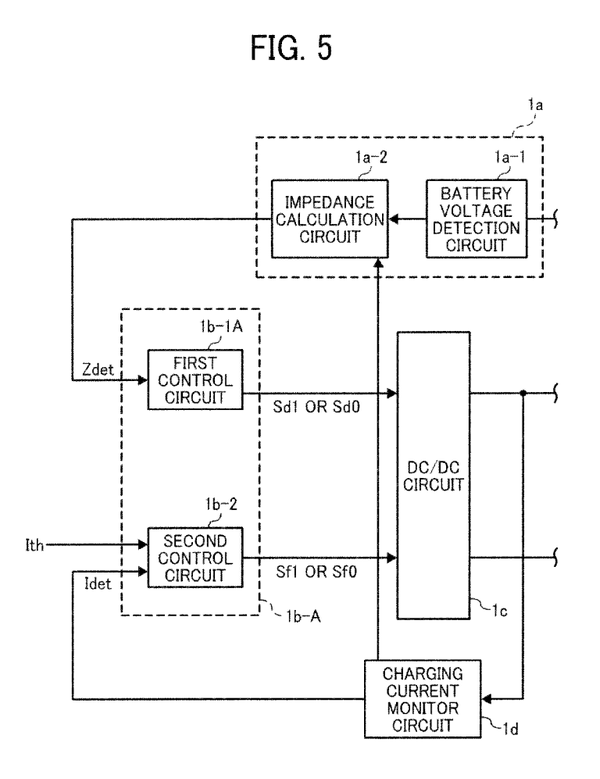
FIG. 5 is an enlarged diagram illustrating circuitry of a charging device according to another illustrative embodiment.

FIG. 5 shows an enlarged diagram illustrating circuitry of the control circuit unit 1b-A according to a second embodiment As shown in FIG. 5, the control circuit unit 1b-A includes a first control circuit 1b-1A and the second control circuit 1b-2. The first control circuit 1b-1A generates a duty-cycle control (keep/decrease) signal Sd2 of a predetermined level in accordance with the measurement result (calculated impedance) Zdet from the impedance measurement circuit 1a to change a duty cycle of a switching pulses SW generated in the DC/DC circuit 1c. Thus, the duty-cycle control signal Sd2 is outputted to the DC/DC circuit 1c.

More specifically, the first control circuit 1a-1A receives the calculated impedance Zdet from the impedance measurement circuit 1a, and outputs a duty-cycle control signal Sd2 that changes a duty cycle of switching pulses SW generated in the DC/DC circuit 1c to classify a predetermined level in accordance with the measured impedance Idet, set in advance. Because other configuration and operation of the second embodiment are similar to the first embodiment, the description thereof is emitted.

In the charging device 1A according to the second embodiment, similar to the first embodiment, the first control circuit 1b-1A changes the duty cycle of the switching pulses SW in the DC/DC circuit 1c in accordance with the calculated impedance Zdet from the impedance measurement circuit 1a.

More specifically, the duty cycle of the switching pulses SW in the DC/DC circuit 1c is decreased when the duty-cycle control signal Sd2 of the predetermined level according to the measurement result (calculated impedance Zdet) from the impedance measurement circuit 1a is outputted. Accordingly, the ripple voltage in the secondary battery 2 can be alleviated.

In addition, in the present embodiment, because the charging-current monitor circuit 1d monitors the change of the charging current supplied to the secondary battery 2, when the decrease in the charging current supplied to the secondary battery 2 is detected by the reduction in the duty cycle of the switching pulses SW, the switching frequency is increased. As the frequency is increased, cycle length becomes shorter. Therefore, the decrease in the charging current I of the secondary battery 2 can be prevented, as can prolongation of the charging time.

As described above, even when the secondary battery 2 is depleted, ripple voltage can be inhibited. In addition, because the charging voltage V can be kept in spite of decrease in duty cycle of the switching pulses SW and the ripple voltage can be inhibited, the PSRR can be maintained.

(Third Embodiment)

Next, a third embodiment is described below with reference to FIGS. 6 and 7.

Figure 6:
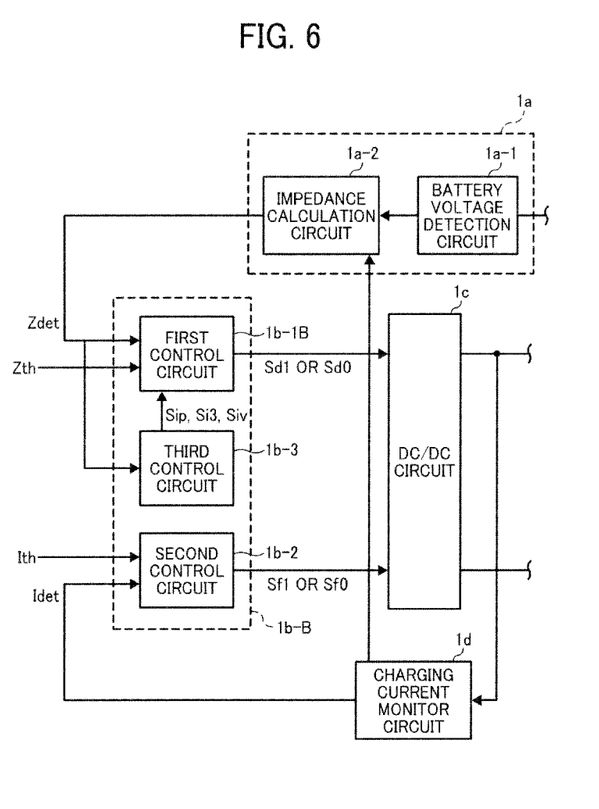
FIG. 6 is an enlarged diagram illustrating circuitry of a charging device according to yet another illustrative embodiment.

FIG. 6 shows an enlarged diagram illustrating a control circuit unit 1b-B according to a third embodiment. As shown in FIG. 6, the control circuit unit 1b-B includes a first control circuit 1b-1B and the second control circuit 1b-2. The third embodiment adds to these two circuits a third control circuit 1b-3.

In this embodiment, the third control circuit 1b-3 changes a current value Ip during pre-charging (shown in FIG. 4A) in accordance with the calculated impedance Zdet of the secondary battery 2 measured by the impedance measurement circuit 1a during the pre-charging, in accordance with external instructions. Further, during the constant-current charging, the third control circuit 1b-3 changes a charging completion current value I3 in a given predetermined level set in advance in accordance with the calculated impedance Zdet of the secondary battery 2 measured by the impedance measurement circuit 1a while constant-current charging is executed. In addition, during the constant-voltage charging, the third control circuit 1b-3 changes a current value Iv during constant-voltage charging in a predetermined level set in advance in accordance with the calculated impedance Zdet of the secondary battery 2 measured by the impedance measurement circuit 1a while constant-voltage charging is executed.

Next, the operation of the charging device 1B is described below with reference to FIG. 7.

Figure 7:
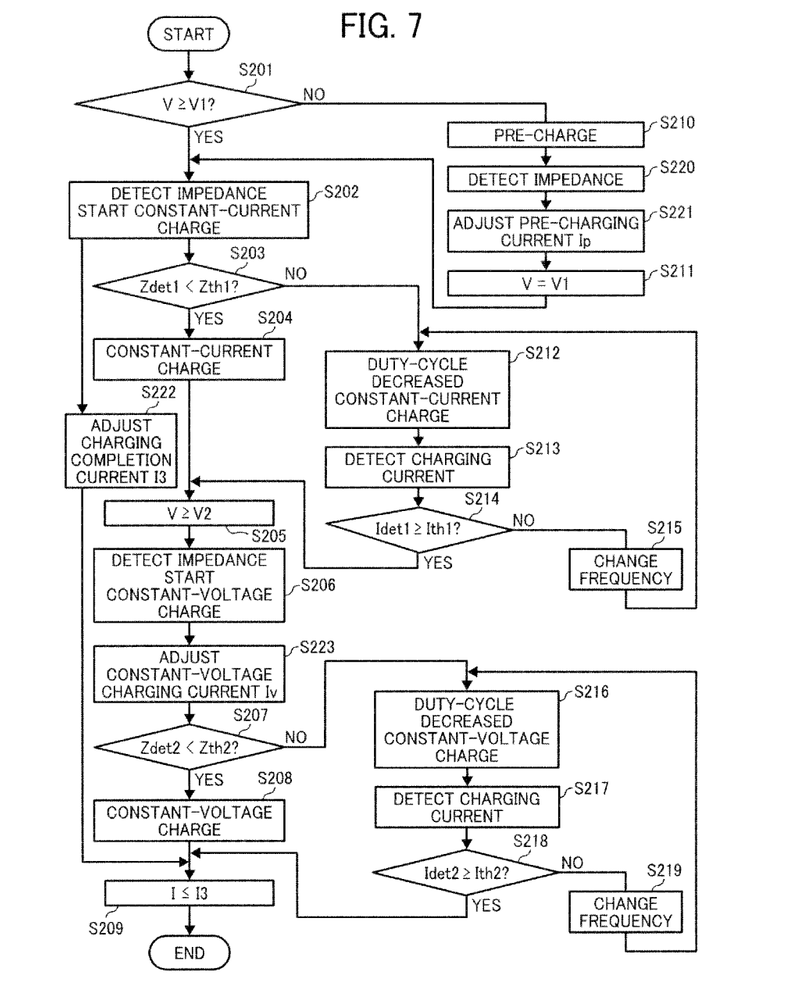
FIG. 7 is a flowchart of operations performed by the charging device shown in FIG. 6.

At step S201 in FIG. 7, when the battery voltage V that is detected by the battery voltage detection circuit 1a-1 is lower than the first predetermined voltage (V≥V1) at the start of charging in the charging device 1B, the process proceeds to step S202 to charge the secondary battery 2 at the constant current (rapid charge) without pre-charging.

By contrast, when the charging voltage V is lower than the predetermined voltage V1 (V<V1, NO at step S201), the charging device 1 performs the pre-charging at step S210. During pre-charging at step S210, the impedance measurement circuit 1a measures impedance Zdet-c of the secondary battery 2 at step S220. The third control circuit 1b-3 outputs a charging-current control signal Sip to adjust the current value Ip during pre-charging, and the charging current of the charging device 1 at the pre-charging is adjusted at step S221.

Then, at step S211, when the charging voltage V reaches the first predetermined voltage V1 by pre-charging, the charging process in charging device 1 proceeds to constant voltage charging at S202.

When the charging device 1 begins rapid charging with the constant current, initially, at step S202, the impedance measurement circuit 1a measures the impedance Zdet1 in the secondary battery 2.

In this embodiment, the processes performed at steps S203, S204, and S212 through S215 shown in FIG. 7 are similar to those performed at steps S103, S104, and S112 through S115 shown in FIG. 3, and therefore, the description of them is omitted.

In the charging device 1B, when the impedance measurement circuit 1a measures the impedance Zdet1 of the secondary battery 2 at step S202, the third control circuit 1b-3 outputs a charging completion current control signal Si3 to adjust the charging completion current value I3 at step S222.

It is to be noted that, although the charging completion current value I3 is adjusted when the constant-current charging starts, alternatively, the charging completion current value I3 can be adjust when the constant-voltage charging starts. In addition, although the charging device 1B adjusts only the charging completion current value I3 during constant-current charging, the third control circuit 1b-3 in the charging device 1B can also adjust a current value Ic during the constant-current charging.

Then, at step S205, when the charging voltage V reaches the second predetermined voltage V2 by constant-current charging or duty-cycle decreased constant-current charging, the charging process in the charging device 1B proceeds to constant voltage charging at S206.

When the charging device 1 begins the constant-voltage charging, initially, at step S206, the impedance measurement circuit 1a measures the impedance Zdet2 in the secondary battery 2.

In this embodiment, the processes performed at steps S207, S208, and S216 through S219 shown in FIG. 7 are similar to those performed at steps S107, S108, and S116 through S119, shown in FIG. 3, and therefore, the description of them is omitted.

In the charging device 1B, when the impedance measurement circuit 1a measures the impedance Zdet2 of the secondary battery 2 at step S206, in accordance with the calculated impedance Zdet2, the third control circuit 1b-3 outputs a charging-current control signal Siv to change a current value Iv during constant-value charging, and the charging current of the charging device 1 at the constant-voltage is adjusted at step S223.

In addition, at step S207, the first control circuit 1b-1 compares the calculated impedance Zdet2 based on the adjusted charging current Iv and the predetermined threshold value Zth2 and determines whether or not the secondary battery 2 is depleted and the restriction of the duty cycle is required.

Then, when the charging current becomes lower than an adjusted charging completion current value (I≤I3) at step S209, the charging device 1B determines that the charging is completed, and then charging operation is finished.

Thus, in the charging device 1B, the third control circuit 1b-3 can adjust a current value Ip during pre-charging (shown in FIG. 4A), the charging completion current value I3, a current value Iv during constant-voltage charging, depending on external instructions. Accordingly, the secondary battery can be charged more effectively.

It is to be noted that, although, in the flowchart shown in FIG. 7, the impedance measurement circuit 1a measures the impedance, when the constant-current charging begins and when the constant-voltage charging begins, the timing to detect impedance is not limited these timing. For example, the charging device 1B according to the present embodiment can detect the impedance, during the constant-current charging, during the constant-voltage charging, during pre-charging, or when the pre-charging begins.

In addition, the control charging circuit unit 1b-B in the charging device 1B can adopt the first control circuit 1a-1A according to the second embodiment, instead of the first control circuit 1b-B.

As described above, in the charging device 1B according to the present embodiment, the first control circuit 1b-1 changes the duty cycle of the switching pulses SW generated in the DC/DC circuit 1c in accordance with the calculated impedance Zdet measured by the impedance measurement circuit 1a.

More specifically, when the calculated impedance Zdet is higher than the threshold value Zth (Zdet>Zth), the duty cycle of the switching pulses SW in the DC/DC circuit 1c is decreased. Accordingly, the ripple voltage in the secondary battery 2 can be alleviated.

In addition, in the present embodiment, because the charging-current monitor circuit 1d monitors the change of the charging current supplied to the secondary battery 2, when the decrease in the charging current supplied to the secondary battery 2 is detected by reducing the duty cycle of the switching pulses SW, the switching frequency is increased. As the frequency is increased, a period length becomes shorter. Therefore, the decrease in the charging current of the secondary battery 2 is prevented, and the prolongation of the charging time can be avoided.

As described above, when the secondary battery is depleted, ripple voltage can be inhibited. In addition, because the charging voltage V can be kept in spite of decrease in the duty cycle of the switching pulses and the ripple voltage can be inhibited, the PSRR can be secured.

(Fourth Embodiment)

Next, a fourth embodiment is described below with reference to FIGS. 8 and 9.

Figure 8:
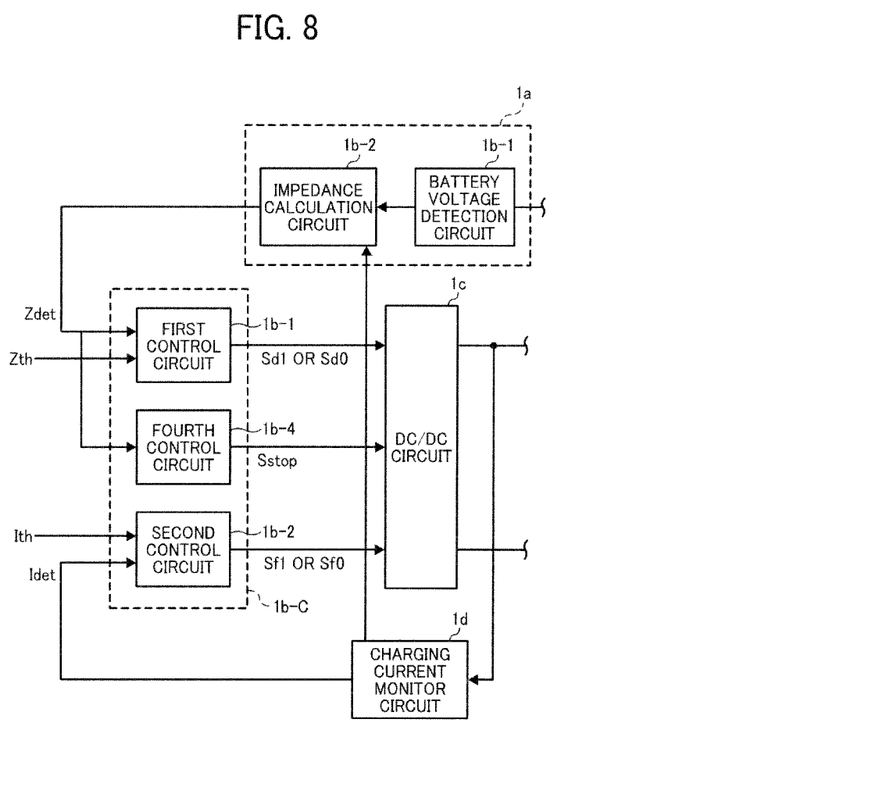
FIG. 8 is an enlarged diagram illustrating circuitry of a charging device according to yet another illustrative embodiment.

FIG. 8 shows an enlarged diagram illustrating the control circuit unit 1b-C according to a fourth embodiment. As shown in FIG. 8, the control circuit unit 1b-C includes the first control circuit 1b-1 and the second control circuit 1b-2. The third embodiment adds to these two circuits a fourth control circuit 1b-4.

In this embodiment, the fourth control circuit 1b-4 includes a timer and adjusts stop times Tstop to stop charging when the charging time t exceeds predetermined durations of pre-charging, constant-current charging, and constant-voltage charging (Tp-max, Tc-max, and Tv-max), in accordance with the calculated impedance Zdet of the secondary battery 2 measured by the impedance measurement circuit 1a, based on external instructions. More specifically, the fourth control circuit 1b-4 adjusts a stop time t1 (shown in FIG. 4A) of the pre-charging in accordance with the calculated impedance Zdet-c during pre-charging, adjusts a stop time t2 of the constant-current charging in accordance with the calculated impedance Zdet1 during the constant-current charging, and adjusts a stop time t3 of the constant-voltage charging in accordance with the calculated impedance Zdet2 during the constant-voltage charging.

In this embodiment, normally, the charging device 1C completes charging when the charging current I reaches the charging completion current value I3. However, if an error occurs, the charging process is stopped when the predetermined duration of pre-charging, constant-current charging, or constant-voltage charging (Tp-max, Tc-max, or Tv-max) has expired. More specifically, in the charging device 1C, the fourth control circuit 1b-4 measures duration of the pre-charging time Tp with a timer and stops charging when the duration Tp has exceeded the predetermined duration Tp-max even when the battery voltage V has not yet reached the predetermined constant voltage V1. Similarly to pre-charging, the fourth control circuit 1b-4 measures duration of the constant-current time Tp with the timer and stops charging when the duration Tc has exceeded the predetermined duration Tc-max even when the battery voltage V has not yet reached the predetermined constant voltage V2. In addition, the fourth control circuit 1b-4 measures duration of the constant-voltage charging Tv with the timer and stops charging when the duration Tv has exceeded the predetermined duration Tv-max even when the battery current I has not yet reached the charging completion current value I3.

Next, the operation of the charging device 1C is described below with reference to FIG. 9.

Initially, at S330, when the charging device 1C starts charging, the fourth control circuit 1b-4 activates the timer to measure the stop time of charging Tstop (t1, t2, t3).

Figure 9:
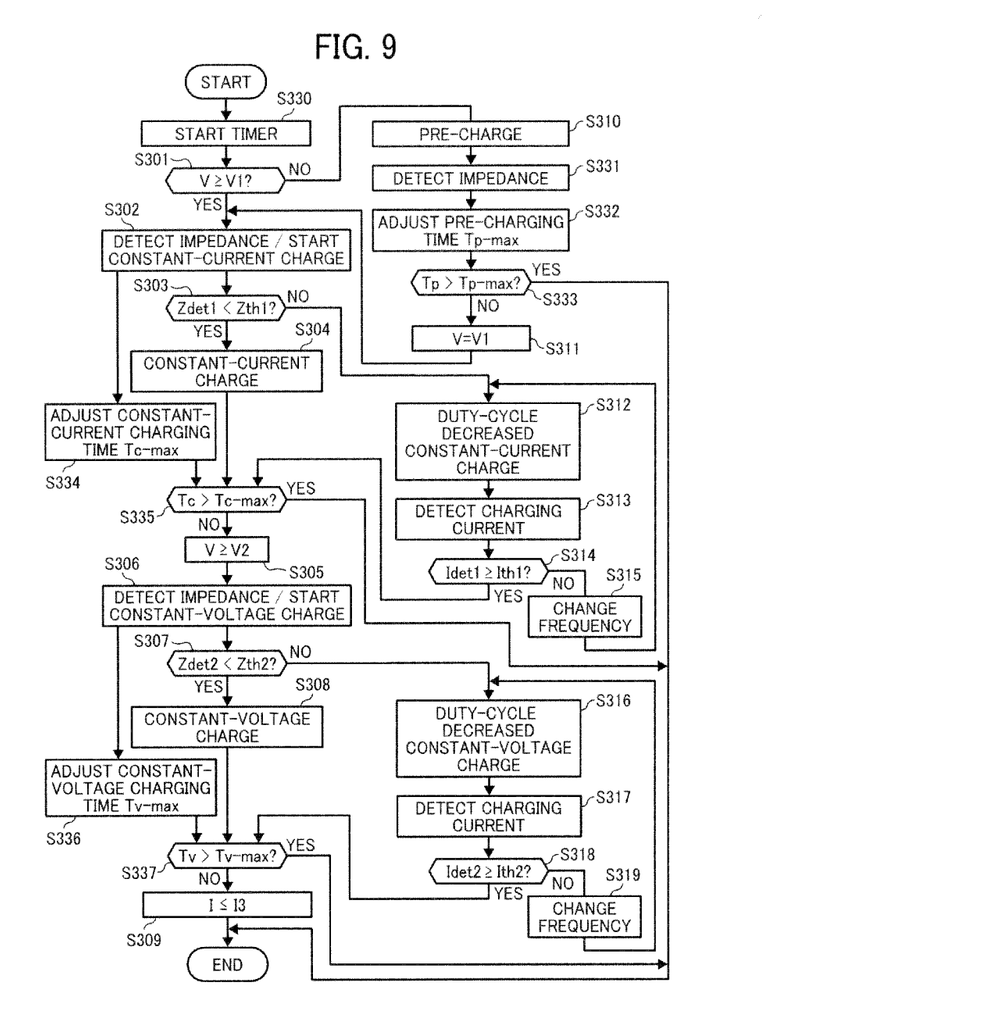
FIG. 9 is a flowchart of operations performed by the charging device shown in FIG. 8.

At step S301 in FIG. 9, when the battery voltage V that is detected by the battery voltage detection circuit 1a-1 is lower than the first predetermined voltage (V≥V1) at the start of charging in the charging device 1C, the process proceeds to step S302 to charge the secondary battery 2 at the constant current (rapid charge) without pre-charging.

By contrast, when the charging voltage V is lower than the predetermined voltage V1 (V<V1, NO at step S301), the charging device 1C performs the pre-charging at step S310.

During pre-charging at step S310, the impedance measurement circuit 1a measures the impedance Zdet-c of the secondary battery 2 at step S331. At this time, the fourth control circuit 1b-4 outputs a pre-charging time stop signal Sstop-p to adjust the stop time t1 of the pre-charging, and thus duration Tp-max of the pre-charging, that is, a pre-charging stop time period Tp-max, is adjusted at step S332.

Then, normally, when the charging voltage V reaches the second predetermined voltage V1 by pre-charging at step S311, the charging process in the charging device 1C proceeds to constant-current charging at S302.

However, when the duration of pre-charging Tp has exceeded the predetermined duration Tp-max due to any error before the battery voltage V reaches the predetermined constant voltage V1 (YES at S333), the charging process is stopped. When the duration of pre-charging Tp has not yet exceeded (NO at S333), the pre-charging is kept until the battery voltage V reaches the first predetermine constant voltage V1.

In addition, in the charging device 1C, even when pre-charging is kept after the battery voltage V has exceeded the predetermined constant voltage V1 due to any error, the charging process is stopped when the duration of pre-charging Tp has exceeded the predetermined duration Tp-max.

When the charging device 1C begins rapid charging with the constant current, initially, at step S302, the impedance measurement circuit 1a measures the impedance Zdet1 in the secondary battery 2.

In this embodiment, the processes performed at step S303, 304, and S312 through S315 shown in FIG. 9 are similar to those performed at steps S103 and S104, and S112 through S115 shown in FIG. 3, and therefore, the description of them is omitted.

In the charging device 1C, when the impedance measurement circuit 1a measures the impedance Zdet1 of the secondary battery 2 at step S302, the fourth control circuit 1b-4 outputs the constant-current charging time stop signal Sstop-c to change the stop time t2 of the constant-current charging, and thus duration Tc-max of the constant-current charging, that is, a constant-current time maximum period (Tc-max), is adjusted at step S334.

Then, normally, when the charging voltage V reaches the second predetermined voltage V2 by constant-current charging at step S305, the charging process in the charging device 1C proceeds constant voltage charging.

However, when the duration of constant-current charging Tc has exceeded the predetermined duration Tc-max due to any error before the battery voltage V reaches the second predetermined constant voltage V2 (YES at S335), the charging process is stopped. When the duration of constant-current charging Tc has not yet exceeded (NO at S335), the constant-current charging is kept until the battery voltage V reaches the second predetermine constant voltage V2.

In addition, in the charging device 1C, even when pre-charging is kept after the battery voltage V has exceeded the predetermined constant voltage V1 due to any error, the charging process is stopped when the duration of pre-charging Tp has exceeded the predetermined duration Tp-max.

When the charging device 1C begins the constant-voltage charging, initially, at step S306, the impedance measurement circuit 1a measures the impedance Zdet2 in the secondary battery 2.

In this embodiment, the processes performed at step S307, S308, and S316 through S319 shown in FIG. 9 are similar to the processes of steps S107, S108, and S116 through S119, and therefore, the description of theses process is omitted.

In the charging device 1C, when the impedance measurement circuit 1a measures the impedance Zdet2 of the secondary battery 2 at step S306, the fourth control circuit 1b-4 outputs the constant-voltage charging stop signal Sstop-v to adjust the stop time t2 of the constant-voltage charging, and thus duration of the constant-voltage charging, that is, the constant-voltage maximum time period Tv-max, is adjusted at step S336.

Then, normally, when the charging current I reaches the charging completion current value I3, the charging device 1C completes charging at step S309.

However, when the duration of constant-voltage charging Tv has exceeded the predetermined duration Tv-max due to any error before the charging current I becomes lower than the completion current value I3, the charging process is stopped. When the duration of constant-voltage charging Tv has not yet exceeded (NO at S333), the constant-voltage charging is kept until the charging current reaches the charging completion current value I3

In addition, in the charging device 1C even when constant-voltage charging is kept after the charging current I becomes lower than the predetermined completion current value I3 due to any error, the charging process is stopped when the duration of constant-voltage charging Tv has exceeded the predetermined duration Tv-max.

It is to be noted that, although, in the flowchart shown in FIG. 9, the impedance measurement circuit 1a measures the impedance, when the constant-current charging begins and when the constant-voltage charging begins, the timing to detect impedance is not limited these timing. For example, the charging device 1C according to the present embodiment can detect the impedance, during the constant-current charging, during the constant-voltage charging, during pre-charging, or when the pre-charging begins.

In addition, the control circuit unit 1b-C in the charging device 1C can adopt the first control circuit 1a-1A according to the second embodiment, instead of the first control circuit 1b-1, and the control circuit unit 1b-C can also include the third control circuit 1b-3 according to the third embodiment.

As described above, in the charging device 1C according to the present embodiment, the first control circuit 1b-1 changes the duty cycle of the switching pulses SW generated in the DC/DC circuit 1c in accordance with the calculated impedance Zdet measured by the impedance measurement circuit 1a.

More specifically, when the calculated impedance Zdet is higher than the threshold value Zth (Zdet>Zth), the duty cycle of the switching pulses SW in the DC/DC circuit 1c is decreased. Accordingly, the ripple voltage in the secondary battery 2 can be alleviated.

In addition, in the present embodiment, because the charging-current monitor circuit 1d monitors the change of the charging current supplied to the secondary battery 2, when the decrease in the charging current supplied to the secondary battery 2 is detected by reducing the duty cycle of the switching pulses SW, the switching frequency is increased. As the frequency is increased, a period length becomes shorter. Therefore, the decrease in the charging current of the secondary battery 2 is prevented, and the prolongation of the charging time can be avoided.

As described above, when the secondary battery is depleted, ripple voltage can be inhibited. In addition, because the charging voltage V can be kept in spite of decrease in the duty cycle of the switching pulses and the ripple voltage can be inhibited, the PSRR can be secured.

In the above-described embodiments, the secondary battery 2 is any secondary battery installable in electronic devices such as mobile phones and portable computers, and each of the charging devices 1, 1A, 1B, and 1C is also installable in such electronic devices. However, the charging devices 1, 1A, 1B, and 1C can be also used for batteries for automobiles, etc.

Numerous additional modifications and variations are possible in light of the above teachings. It is therefore to be understood that, within the scope of the appended claims, the disclosure of this patent specification may be practiced otherwise than as specifically described herein.

This patent specification claims priority from Japanese Patent Application No. 2009-169750, filed on Jul. 21, 2009 in the Japan Patent Office, the entire contents of which are hereby incorporated by reference herein.

What is claimed is:

1. A charging device to charge a secondary battery, the charging device comprising:
    a DC/DC circuit to generate a charging current supplied to the secondary battery;
    an impedance measurement circuit to measure an impedance of the secondary battery;
    a first control circuit to output a duty-cycle decrease signal in accordance with the measured impedance:
    a charging-current monitor circuit to detect the charging current outputted from the DC/DC circuit when the duty cycle of the pulses generated by the DC/DC circuit is decreased by the duty-cycle decrease signal; and
    a second control circuit to compare the charging current detected by the charging-current monitor circuit and a charging-current threshold and to output to the DC/DC circuit a frequency change signal that increases a switching operation frequency in the DC/DC circuit,
    wherein the second control circuit determines from the comparison of the charging current detected by the charging-current monitor circuit and a charging-current threshold that the power supply for the secondary battery has decreased and in response outputs a frequency change signal to the DC/DC circuit to cause the switching operation frequency in the DC/DC circuit to change.

2. The charging device according to claim 1, wherein the first control circuit compares the impedance measured by the impedance measurement circuit to a predetermined impedance threshold and outputs the duty-cycle decrease signal to the DC/DC circuit to decrease the duty cycle of pulses generated in the DC/DC circuit when the measured impedance is greater than the threshold.

3. The charging device according to claim 1, wherein the first control circuit classifies the impedance measured by the impedance measurement circuit into levels and outputs the duty-cycle decrease signal to the DC/DC circuit to reduce the duty cycle of pulses generated in the DC/DC circuit in accordance with the level of impedance.

4. The charging device according to claim 1, further comprising:
    a battery-voltage detection circuit to detect a secondary battery voltage charge in the secondary battery,
    wherein the charging device performs pre-charging with a predetermined first constant current when the secondary battery voltage detected by the battery-voltage detection circuit is lower than a first predetermined voltage, performs constant-current charging with a predetermined second constant current higher than the predetermined first constant current when the detected secondary battery voltage is higher than the first predetermined voltage, and performs constant-voltage charging when the detected secondary battery voltage reaches a second predetermined voltage greater than the first predetermined voltage.

5. The charging device according to claim 4, wherein the charging device stops the charging when the charging current detected by the charging-current monitor circuit becomes equal to or lower than a predetermined completion current value.

6. The charging device according to claim 5, further comprising
    a third control circuit to output a pre-charging current change signal, a pre-charging a current at constant-current changing signal, and a charging completion current control signal to the DC/DC circuit.

7. The charging device according to claim 6, further comprising:
    a fourth control circuit to output a charging stop signal during pre-charging, during constant-current chagrining, and a constant voltage charging, to the DC/DC circuit.

8. The charging device according to claim 7, wherein the charging device stops charging when the pre-charging time exceeds the pre-charging stop time, when the constant-current charging time exceeds the constant-current stop time, and when the constant-voltage charging time exceeds the constant-voltage charging stop time before the charging current detected by the charging-current monitor circuit becomes equal to or lower than a predetermined completion current value.

9. An electronic device that employs the charging device according to claim 1.

10. A method for controlling a charging device to charge a secondary battery, the method comprising:
    generating a charging current supplied to the secondary battery with a DC/DC circuit;
    measuring impedance of the secondary battery;
    adjusting a duty cycle of pulses generated in the DC/DC circuit in accordance with the measured impedance;

detecting a charging current supplied to the secondary battery;

comparing the detected charging current and a first charging-current threshold when the duty cycle of the pulses generated in the DC/DC circuit is adjusted;

increasing a clock frequency of the DC/DC circuit; and determining from the comparison of the charging current and the charging-current threshold that the power supply for the secondary battery has decreased and in response outputting a frequency change signal to the DC/DC circuit to cause the switching operation frequency in the DC/DC circuit to change.

11. The method for controlling the charging device according to claim 10, further comprising:

comparing the measured impedance to a predetermined impedance threshold; and decreasing the duty cycle of pulses generated in the DC/DC circuit when the measured impedance is greater than the threshold.

12. The method for controlling the charging device according to claim 10, further comprising:

classifying the measured impedance into levels; and decreasing the duty cycle of pulses generated in the DC/DC circuit in accordance with the classified leveled of impedance.

13. The method for controlling the charging device according to claim 10, further comprising:

detecting a secondary battery voltage charged in the secondary battery;

performing pre-charging with a predetermined first constant current when the detected secondary battery voltage is lower than a first predetermined voltage;

charging the secondary battery with a predetermined second constant current higher than the first constant current when the detected secondary battery voltage is higher than the first predetermined voltage; and charging the secondary battery with a constant voltage when the battery voltage of the detected secondary battery reaches a second predetermined voltage higher than the first predetermined voltage.

14. The method for controlling the charging device according to claim 13; further comprising:

stopping the charging when the charging current detected by the charging-current monitor circuit becomes equal to or lower than a predetermined completion current value.

15. The method for controlling the charging device according to claim 14, further comprising:

changing a charging current at the pre-charging;

changing a charging current at the constant-current charging; and setting and changing a charging completion current value.

16. The method for controlling the charging device according to claim 13, further comprising:

setting and changing a stop time of the pre-charging current;

setting and changing a stop time of the constant current charging; and setting and changing a stop time of the constant-voltage charging.

17. The method for controlling the charging device according to claim 16, further comprising:

stopping charging when the pre-charging time is over the pre-charging stop time, when the constant-current charging time is over the constant-current charging stop time, and when the constant-voltage charging time is over the constant-voltage charging stop time before the charging current detected by the charging-current monitor circuit becomes equal to or lower than a predetermined completion current value.

\* \* \* \* \*